June 27, 1933.  E. KOHLSTEDT  1,915,465
VARIABLE PITCH PROPELLER
Filed March 23, 1931  2 Sheets-Sheet 1
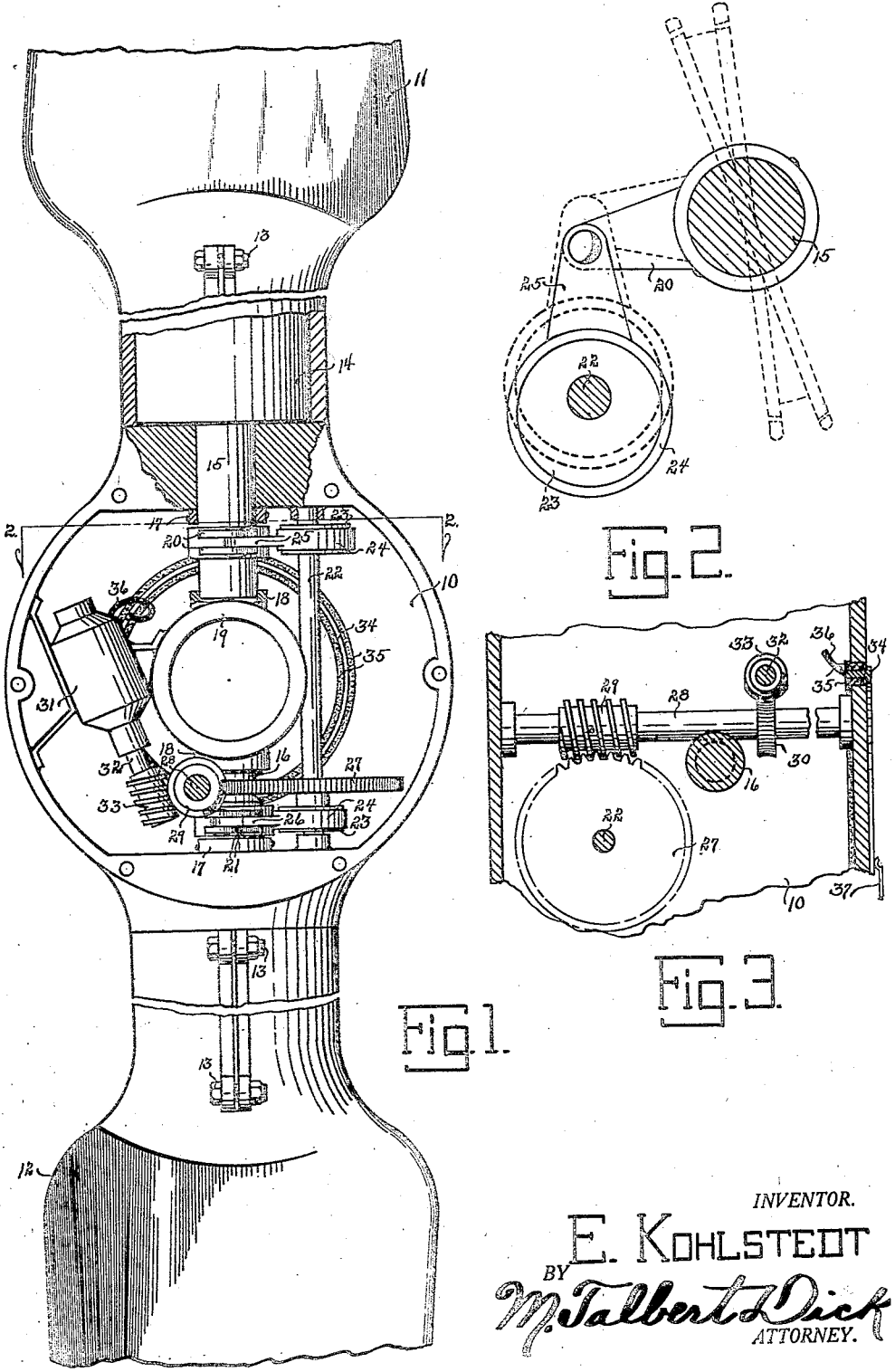
INVENTOR.
E. KOHLSTEDT
BY M. Talbert Dick
ATTORNEY.

June 27, 1933.  E. KOHLSTEDT  1,915,465
VARIABLE PITCH PROPELLER
Filed March 23, 1931  2 Sheets-Sheet 2

INVENTOR.
E. KOHLSTEDT
BY M. Talbert Dick
ATTORNEY.

Patented June 27, 1933

1,915,465

UNITED STATES PATENT OFFICE

EDWIN KOHLSTEDT, OF ALTA, IOWA, ASSIGNOR OF ONE-HALF TO ELTON D. PETERSON, OF HARLAN, IOWA

VARIABLE PITCH PROPELLER

Application filed March 23, 1931. Serial No. 524,470.

The principal object of this invention is to provide a means for simultaneously varying the pitch of aircraft propeller blades while the propeller is in motion.

A further object of this invention is to provide a propeller blade assembly for aircrafts that may easily and accurately have the pitch of its propeller blades changed by the operator of the aircraft and from a position distant from the propeller blade assembly.

A still further object of this invention is to provide a variable pitch propeller for aircrafts or the like that may be easily and quickly attached to the engine shaft of that vehicle without altering the design or construction of either the motor to which it is secured or the aircraft.

A still further object of my invention is to provide a variable pitch propeller that provides absolute accuracy and perfect synchronization of the blades during the operation of varying the pitch of the blades and one that rigidly holds the blades in perfect synchronization after the desired pitch has been obtained.

A still further object of my invention is to provide a controllable variable pitch propeller that is not only safe at all flight speeds, but one that has a minimum of air resistance during the flight of the aircraft to which it is secured.

A still further object of my invention is to provide a variable pitch propeller that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a front elevation of my variable pitch propeller with sections cut away to more thoroughly illustrate its construction.

Fig. 2 is an end view of a portion of the mechanism for rotating and changing the pitch of one of the propeller blades and is taken on line 2—2 of Fig. 1.

Fig. 3 is an end view of a part of the gears used for operatively connecting the prime mover with the blade varying mechanism.

Figure 4:
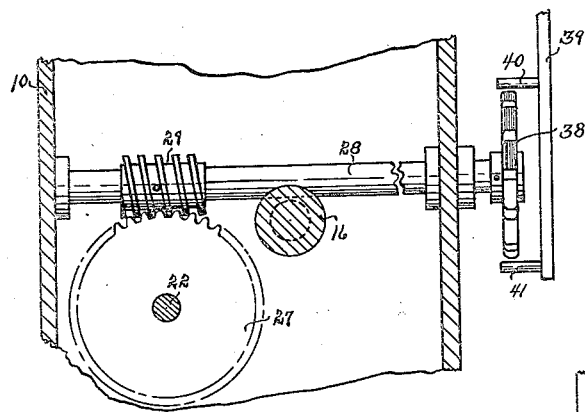
Fig. 4 is a modified form of construction as shown in Fig. 3 and is recommended when an electric motor is not used to operate the blade varying mechanism.

Air dynamic engineers have devoted much effort toward the perfecting of mechanism for changing the pitch of propeller blades to meet the requirements of aircrafts flying at varying speeds, varying heights, and varying rates of climb of the aircraft per minute. The objection, however, to such propellers now in use is that they are not only variable, but are reversible, which is undesirable and dangerous, due to the fact that if they accidentally became reversed in their pitch or were accidentally placed in such a condition by the operator of the airplane, the plane would stall and a spin to the earth would result with perhaps serious loss of life and property. Furthermore, such reversible propellers are difficult to install and cannot be operated either with accuracy or dispatch. I have overcome such objections as will hereinafter be appreciated.

I have used the numeral 10 to designate a hollow propeller hub designed to be secured to the engine shaft of an aircraft motor in the usual and well known manner. In Fig. 1 this hollow hub is shown with the usual spinner cap removed and is designed to support radially and oppositely extending propeller blades 11 and 12. These propeller blades 11 and 12 may be of any suitable material such as steel or duralumin. These blades are each secured by tightening bolts 13 to and around a base member 14, as shown in Fig. 1. These base members 14 have their inner ends flat and engage the two flat ends of the hub 10, respectively.

The numerals 15 and 16 designate the two shafts integrally formed on the inner ends of each of the members 14 respectively and extending into the hollow hub 10. It will here be noted that the inside ends of the hub 10 are also of flat construction, as shown in Fig. 1. The numeral 17 designates a collar embracing each of the shafts 15 and 16 and located inside of the hub. These collars 17 engage the flat inside ends of the hub 10 respectively, thereby preventing the withdrawal of the shafts 15 and 16, but permitting their free rotation. To promote strength and ease of rotation of the shafts 15 and 16, I have provided a bearing member 18 for the inner ends of each of the shafts. These bearing members 18 are secured to the central collar 19 of the hub, which embraces the engine shaft. From the foregoing description, it will readily be seen that if either the shafts 15 or 16 are rotated the propeller blades to which they are secured will also be rotated. The numeral 20 designates a pair of spaced arms rigidly secured on the shaft 15 and the numeral 21 designates a pair of spaced apart arms rigidly secured on the shaft 16. Rotatably mounted inside the hub 10 and parallel with the shafts 15 and 16, as shown in Fig. 1, is a drive shaft 22. The numeral 23 designates an eccentric rigidly secured on each of the end portions of the drive shaft 22 and in close proximity to the arms 20 and 21 respectively. These two eccentrics are diametrically and oppositely arranged relative to each other in order that when one of the eccentrics is extending in one direction the other eccentric will be extending in the opposite direction, as shown in Fig. 1. Embracing and rotatably mounted on each of the eccentrics 23 is a circular strap 24. The numeral 25 designates a link hingedly connected at one of its ends to the outer end portions of the arms 20 and its other end rigidly secured to the circular band adjacent those arms.

The numeral 26 designates a similar link hingedly secured at one of its ends to the outer end portions of the arms 21 and its other end rigidly secured to the circular band adjacent those arms. By this arrangement when the shaft 22 is rotated the arms 20 and 21 will be reciprocated forth and back, thereby continuously rotating the propeller blades a few degrees in one direction and then reversing them a few degrees in the opposite direction of rotation. As the eccentrics 23 are oppositely arranged to each other the propeller blades will not only be synchronized one with the other, but will always rotate in opposite directions to each other, thereby providing the same desirable, uniform thrust and pitch on the oppositely extending blades at all times. The numeral 27 designates a large gear wheel having worm gear teeth on its periphery and rigidly secured on the shaft 22. The numeral 28 designates a rotatably mounted shaft inside the hub 10 and extending transversely of the shaft 22. The numeral 29 designates a small worm gear rigidly secured on the shaft 28 and in engagement with the teeth of the gear wheel 27. The numeral 30 designates a small worm gear on the shaft 28. The numeral 31 designates a small electric motor suitably mounted inside the hub 10. On the armature shaft 32 of this motor is a worm gear 33, in engagement with the worm gear 30. By this construction when the electric motor 31 is running, the shaft 22 will be slowly rotated and the propeller blades will have their angle of attack slowly increased, and decreased, as herebefore explained. The number of degrees of the change of attack of the propeller blades at each complete revolution of the shaft 22, will be relative to the dimensions of the eccentrics and lengths of the arms 20, 21, 25 and 26.

The variation, however, in the pitch of the propeller blades will never be such but that forward thrust will result from the rotation of the propeller, and by no possibility will the pitch of the propeller blades be moved to a reversed position. By the use of the reduction gears in the hub some time will elapse during the extreme movements of the propeller blades. By stopping the motor at any point in the rotation of the propeller blades, the blades will be rigidly held, due to the worm gears, rigidly in that desired angle of their attack. When in flight the approximate angle of attack of the propeller blades may be easily ascertained by the pilot by observing the operation of the aircraft of the air speed indicator. As before stated when the proper pitch of the propellers has been obtained, the motor 31 is switched off. By the use of my invention, safety at all times is assured and no harm could possibly result even if the motor 31 was left running and the pitch of the propeller blades were being constantly changed thereby.

The electric motor 31 is easily controlled from the pilot's seat by any suitable electric switch in the circuit between the source of electrical energy and the motor 31. In order to properly pass the source of electrical energy to the motor 31, while the propeller is in motion I have provided a metal ring 34 concentric with the motor shaft and in the rear side of the hub 10, as shown in Fig. 1 and Fig. 3. This ring 34 is properly insulated from the metal hub 10 by insulation 35. The numeral 36 designates a lead wire having one end making electrical contact with the motor 31 and its other end making electrical contact with the ring 34.

The numeral 37 designates any suitable yielding electrical contact means secured to the aircraft and engaging the ring 34, as shown in Fig. 3.

Figure 5:
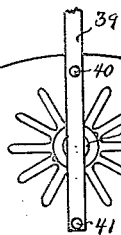
Fig. 5 is a rear end sectional view of a portion of the propeller hub showing a pin wheel for operating the blade varying mechanism.
Figure 6:
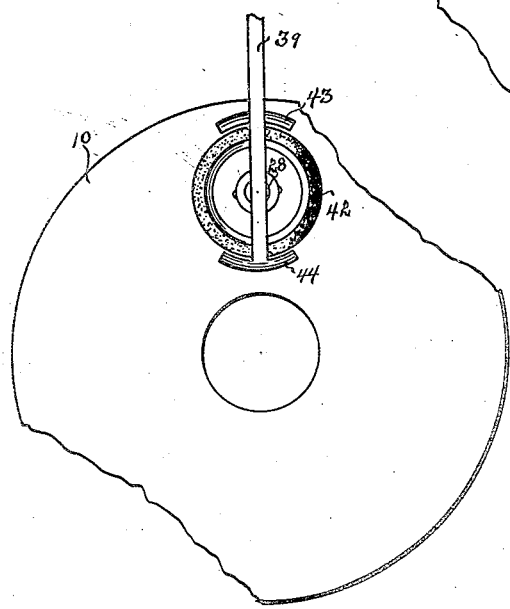
Fig. 6 is a rear end sectional view of a portion of the propeller hub showing a friction wheel for operating the blade varying mechanism.

In Figures 4, 5 and 6, I show different methods of rotating the shaft 22 when an electric motor is not used. In Fig. 4, I extend the rotatably mounted shaft 28 through the rear side of the hub 10. On the outside of the hub 10 and rigidly secured on the rear end of the shaft 28, I place a pin wheel 38. The numeral 39 designates a longitudinally slidable bar adjacent the face of the pin wheel 38. The numerals 40 and 41 designate two projections on the bar 39 and extending at each side of the pin wheel 38. As the shaft 28 is at the side of the dead center of the hub 10, this pin wheel will travel around the dead center of the hub 10 when the propeller is rotated. By sliding the bar 39 in one direction, the projection 40 will engage one of the pins of the pin wheel 38 at each revolution of the propeller, thereby slowly rotating the shaft 28 in one direction. By sliding the bar 39 in the opposite direction, the projection 40 will be moved out of possible engagement with the pin wheel 38, and the projection 41 will be moved to a position where it will engage the pin wheel 38 and as it is oppositely positioned relative to the pin wheel 38, the shaft 28 will be rotated in the opposite direction, thereby making it possible for the pilot to rotate the shaft 22 in either direction at will, while the propeller is in motion. By placing the bar 39 in a neutral position, as shown in Fig. 4, the projections 40 and 41 will not be engaging the pin wheel 38 and the propeller blades will be rigidly held against any undesirable rotation.

In Fig. 6, I show a very similar construction except that a friction wheel 42 having a resilient periphery is substituted for the pin wheel 38. Instead of using the projections 40 and 41, I provide in their place the two shoes 43 and 44.

Dynamic balance of the entire assembly of the device may be obtained in any suitable manner such as counterbalance weights or like.

By using my variable pitch propeller the take-off of airplanes is facilitated and the ability to climb is increased, especialy at high altitudes. Also, the life of the motor is lengthened by reducing excessive strains at times and makes it possible to install lower horse power motors in planes than is the present day standard. The use of my propeller also saves on the consumption of fuel and oil.

Some changes may be made in the construction and arrangement of my improved variable pitch propeller without departing from the real spirit and purpose of my invention, and it is my intention to cover by my claims any modified forms of structure or use of mechanical equivalents which may be reasonably included within their scope.

I claim:

1. In a variable pitch propeller, a hub portion, a pair of propeller blades rotatably secured to said hub portion, an eccentric shaft journaled on said hub portion, two opposed eccentric wheels on said shaft, an eccentric strap around each of said eccentric wheels, a bell crank pivotally connecting one of said straps to one of said propeller blades, a second bell crank pivotally connecting the other said strap to the other said propeller blade, and a means for rotating said eccentric shaft at times.

2. In a variable pitch propeller, a hub portion, a plurality of propeller blades rotatably secured to said hub portion, a plurality of rotatably mounted eccentric wheels on said hub portion, an eccentric strap embracing each of said eccentric wheels, a means for operatively connecting said propeller blades with said eccentric straps respectively, and a means for rotating said eccentric wheels.

3. In a variable pitch propeller, a hollow hub portion, a pair of propeller blades rotatably secured in said hub, an eccentric shaft journaled in said hub, two eccentric wheels on said shaft, an eccentric strap slidably embracing each of said eccentric wheels, a bell crank pivotally connecting one of said straps to one of said propeller blades, a second bell crank pivotally connecting said other strap to said other propeller blade, and a means for rotating said eccentric shaft at times.

4. In a variable pitch propeller, a hub portion, a propeller blade rotatably secured to said hub, an eccentric shaft journaled on said hub portion, an eccentric wheel on said shaft, an eccentric strap slidably embracing said eccentric wheel, an arm secured to said propeller blade and extending transversely of its longitudinal axis, a link member rigidly secured to said eccentric strap extending substantially at a right angle to said arm, a means for pivotally securing said arm and said link to each other, and a means for rotating said shaft at times.

EDWIN KOHLSTEDT.